United States Patent
Fan et al.

(10) Patent No.: US 8,189,614 B2
(45) Date of Patent: May 29, 2012

(54) CABLE MODEM AND METHOD OF ESTABLISHING QUALITY OF SERVICE THEREOF

(75) Inventors: Huai-Chih Fan, Taipei Hsien (TW);
Yew-Min Lo, Taipei Hsien (TW);
Chun-Chieh Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 273 days.

(21) Appl. No.: 12/633,871

(22) Filed: Dec. 9, 2009

(65) Prior Publication Data
US 2011/0013680 A1    Jan. 20, 2011

(30) Foreign Application Priority Data
Jul. 17, 2009    (CN) .......................... 2009 1 0304449

(51) Int. Cl.
*H04L 12/66* (2006.01)

(52) U.S. Cl. ...................................................... 370/463
(58) Field of Classification Search .................. 370/463, 370/464, 477, 252, 253
See application file for complete search history.

(56) References Cited

U.S. PATENT DOCUMENTS
6,738,353 B2    5/2004  Chong
2009/0144425 A1*  6/2009  Marr et al. ................... 709/226
* cited by examiner

*Primary Examiner* — Gary Mui
(74) *Attorney, Agent, or Firm* — Altis Law Group, Inc.

(57) ABSTRACT

A cable modem for establishing quality of service (QoS) for a real-time transport protocol (RTP) voice stream. The cable modem receives different packet types from a network, and establishes a BPU for each packet type. After reading one BPU periodically, the cable modem determines whether the BPU has QoS. Accordingly, the cable modem distributes a fixed bandwidth to establish QoS.

20 Claims, 3 Drawing Sheets

CABLE MODEM AND METHOD OF ESTABLISHING QUALITY OF SERVICE THEREOF

BACKGROUND

1. Technical Field

Embodiments of the present disclosure relate to modems, and more particularly to a cable modem and a method of establishing quality of service (QoS) thereof.

2. Description of Related Art

Recently, with developments in technology, the Internet allows transmission of not only data-based information but also voice information by real-time transport protocol (RTP).

Currently, a customer premise equipment (CPE) connects to the Internet by a cable modem, which must offer a fixed bandwidth by means of which the CPE can establish QoS for an established voice packet stream. During the process of connection between the CPE and the Internet, the CPE maintains occupancy of the fixed bandwidth irrespective of the presence of a voice packet stream to transmit. At the same time, a decoder of the CPE utilizing a complicated algorithm to decrypt encrypted voice packet stream is required, and QoS must be determined for the encrypted voice packet stream after decryption. Thus, loading on the cable modem is increased and limited utilization rate of the limited bandwidth provided.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be recorded in any type of computer-readable medium or other storage device. Some or all of the methods may alternatively be embodied in specialized computer hardware or communication apparatus.

Figure 1:
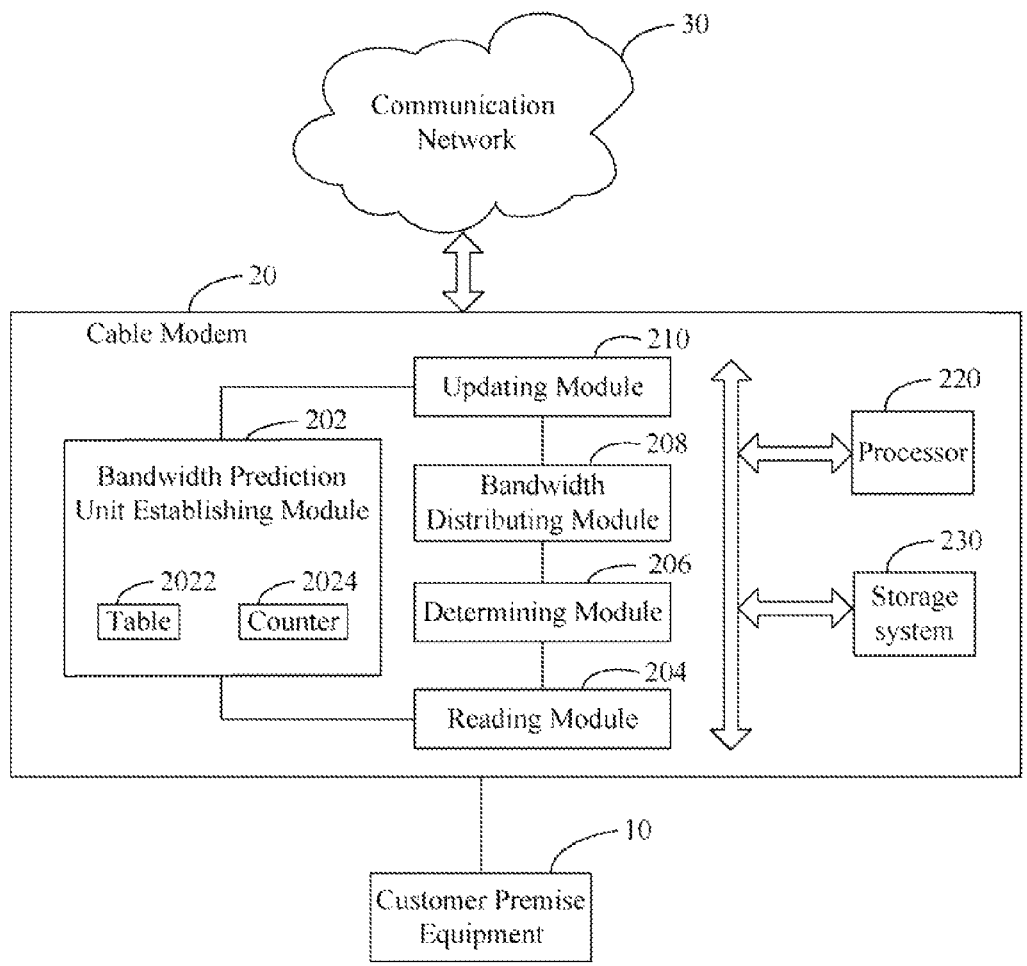
FIG. 1 is a schematic diagram of an application environment and functional modules of one embodiment of a cable modem of the present disclosure.

FIG. 1 is a schematic diagram of an application environment and functional modules of one embodiment of a cable modem 20 of the present disclosure. In one embodiment, customer premise equipment (CPE) 10 connects to a communication network 30 by the cable modem 20. The CPE 10 may be a notebook, or a personal digital assistant, for example.

The cable modem 20 comprises a bandwidth prediction unit (BPU) establishing module 202, a reading module 204, a determining module 206, a bandwidth distributing module 208, an updating module 210, at least one processor 220, and a storage system 230, where the BPU establishing module 202 comprises a table 2022 and a counter 2024. The modules 202, 204, 206, 208, and 210 may include one or more computerized instructions stored in the storage system 230 and executed by the at least one processor 220.

The BPU establishing module 202 is operable to receive different inbound packet types from the communication network 30 and establish a BPU for each of the different inbound packet types. Each BPU comprises a source address field, a destination address field, a packet size field, a traffic field, and a QoS field respectively operable to record a source address, a destination address, a packet size, a traffic status, and a QoS status for each inbound packet type. A value of the traffic field changes along with the real traffic status of the corresponding inbound packet type.

The BPU establishing module 202 further comprises a table 2022 operable to store BPUs of the different inbound packet types. In one embodiment, each inbound packet comprises a head section and a content section. The head section comprises a source address field, a destination address field, and a packet size field respectively operable to record a source address, a destination address, and a packet size. In one embodiment, the inbound packets comprise encrypted voice packets or unencrypted voice packets, and the communication network 30 can also transmit an encrypted voice packet stream composed of multiple encrypted voice packets. Each encrypted voice packet comprises an encrypted content section and an unencrypted head section, and the unencrypted head section also comprises a source address field, a destination address field, and a packet size field.

In one embodiment, the BPU establishing module 202 is further operable to determine whether an inbound packet is the same size as a RTP voice packet after receiving the inbound packet from the communication network 30. In one embodiment, different standards using the RTP define different voice packet sizes. For example, a standard of G.711 defines a voice packet size of 200 bytes. In one embodiment, a method of determining whether the inbound packet is the same size as the RTP voice packet is by reading the head section of the inbound packet. In one embodiment, if the inbound packet is the same size as the RTP voice packet, then the inbound packet may be a voice packet. If the inbound packet is not the same size as the RTP voice packet, then the inbound packet is not a voice packet, and the cable modem 20 directly sends the inbound packet and receives a subsequent packet.

In one embodiment, the BPU establishing module 202 is further operable to determine whether the inbound packet matches one BPU of the BPU table if the inbound packet is the same size as the RTP voice packet. In one embodiment, the cable modem 20 has recorded a plurality of BPUs in the BPU table, and a method of determining whether the inbound packet matches one BPU of the BPU table is by reading the head section of the inbound packet. In one embodiment, if a source address field, a destination address field and a packet size field of the inbound packet are the same as the corresponding field of one BPU of the BPU table, the BPU establishing module 202 determines the inbound packet matches the BPU of the BPU table. Otherwise, the BPU establishing module 202 determines the inbound packet matches no BPU of the BPU table.

In one embodiment, the BPU establishing module 202 further comprises a counter 2024 operable to count the inbound packets, and when an inbound packet matches one BPU of the BPU table, to update the traffic of the matched BPU accordingly. In one embodiment, if the inbound packet matches one BPU of the BPU table, then the counter 2024 updates the number of the inbound packets with the same source address, the same destination address and the same packet size to calculate the traffic of the BPU. For example, if the BPU establishing module 202 receives 10 packets with the same source address, the same destination address and the same packet size in one second, the traffic is 10 packets per second. In one embodiment, by updating the number of the inbound packets with the same source address, the same destination address and the same packet size, the cable modem 20 monitors the traffic dynamically.

In one embodiment, the BPU establishing module 202 is further operable to establish a new BPU according to the source address, the destination address, and the inbound packet size of the inbound packet if the inbound packet does not match any BPU of the BPU table. In one embodiment, the BPU comprises a source address field, a destination address field, a packet size field, a traffic field, and a QoS field respectively operable to record a source address, a destination address, a packet size, a traffic status, and a QoS status, and the value of the traffic field changes along with the real traffic status of the corresponding packet type. In one embodiment, a BPU recorded in the BPU table for the first time only comprises the source address field, the destination address field and the inbound packet size field, and the traffic field and the QoS field will not record any information until a subsequent reading cycle. Therefore, not all the fields of each BPU record information.

The reading module 204 is operable to read one BPU periodically. In one embodiment, the traffic is used to indicate the number of inbound packets with the same source address, the same destination address and the same packet size in the current status, and the value of the traffic is changed dynamically. The reading module 204 reads all BPUs from the BPU table periodically, and the time of a period is set to a proper value to make sure all BPUs in the BPU table can be read in one period.

The determining module 206 is operable to determine whether a value of the traffic field of the read BPU exceeds a predetermined threshold, determine whether an acceleration of the traffic of the read BPU equals zero if the value of the traffic field of the read BPU exceeds the predetermined threshold, and determine whether the QoS field of the read BPU records a fixed bandwidth if the acceleration of the traffic of the read BPU equals zero.

In one embodiment, the received packet stream is not in accordance with the standard of a voice packet stream using RTP if the value of the traffic field of the read BPU is less than the predetermined threshold. In practice, the value of the predetermined threshold set by the cable modem 20 is different according to the different standards. For example, the standard of G.711 defines a speed of voice packet stream is 64 kilobits per second (kbps), and accordingly the predetermined threshold is also set to 64 kbps. Thus, when the traffic is less than 64 kbps, the determination module 206 determines the received packet stream is not a voice packet stream and reads a subsequent BPU from the BPU table.

In one embodiment, if the value of the traffic field of the read BPU exceeds the predetermined threshold, then the determining module 206 needs to determine whether an acceleration of the traffic of the read BPU equals zero. In one embodiment, the value of the traffic of the BPU table is changed dynamically. Therefore, if the cable modem 20 receives 20 packets with the same source address, the same destination address, and the same packet size in a first second, and receives 20 packets with the same source address, the same destination address, and the same packet size in a second second, then the determining module 206 determines the acceleration of the traffic of the read BPU equals zero. If the cable modem 20 receives 30 packets with the same source address, the same destination address, and the same packet size in the second second, then the determining module 206 determines the acceleration of the traffic of the read BPU is not equal to zero.

In practice, the voice packet stream transmitted in the communication network 30 has the same speed. In one embodiment, an interval for determining whether the acceleration of the traffic of the read BPU equals zero is two seconds. If the number of the inbound packets with the same packet source address, the same packet destination address and the same packet size are received in the first second is the same as that in the second second, then the determining module 206 determines the acceleration of the traffic of the read BPU equals zero and indicates that the received packet stream is in accordance with the character of the same speed of the voice packet stream using RTP. If the number of the inbound packets with the same packet source address, the same packet destination address and the same packet size are received in the first second is not the same as that in the second second, then the determining module 206 will read a subsequent BPU from the BPU table. In other embodiment, the interval maybe set another time.

In one embodiment, if the acceleration of the traffic of the read BPU equals zero, then the determining module 206 determines whether the QoS field of the read BPU records a fixed bandwidth. In one embodiment, it is indicate that the received packet stream is a voice packet stream when the determining module 206 determines the acceleration of the traffic of the read BPU equals zero, and the determining module 206 determines whether the QoS field of the read BPU records a fixed bandwidth. In one embodiment, if the QoS field of the read BPU records a fixed bandwidth, then the determining module 206 determines the presence of QoS in the received packet stream. If the QoS field of the read BPU records no fixed bandwidth, then the determining module 206 determines the absence of QoS in the received packet stream.

The bandwidth distributing module 208 is operable to distribute a fixed bandwidth and record the fixed bandwidth in the QoS field of the read BPU if the QoS field of the read BPU records no fixed bandwidth. For example, if the traffic of the voice packet stream is 64 kbps, then the cable modem 20 will offer at least 64 kbps to the voice packet stream to establish QoS and record 64 in the QoS field of the read BPU to indicate the presence of QoS in the received packet stream.

The updating module 210 is operable to update the traffic of the read BPU and record the updated traffic in the traffic field of the read BPU if the QoS field of the read BPU records a fixed bandwidth, and operable to update a fixed bandwidth of the read BPU according to the updated traffic and record the fixed bandwidth in the QoS field of the read BPU. In one embodiment, for example, the traffic of the voice packet stream is increased from 64 kbps to 128 kbps, which means that the voice packet stream has a request to add the fixed bandwidth and the fixed bandwidth of 64 kbps will not meet the request, then the cable modem 20 will offer the fixed bandwidth of at least 128 kbps to the voice packet stream according to the updated traffic. If the voice packet stream is decreased from 64 kbps to 0 bit per second, the cable modem 20 will not offer the fixed bandwidth to the voice packet stream according to the updated traffic. In one embodiment, the cable modem 20 offers the fixed bandwidth by monitoring the traffic of the voice packet stream to improve the QoS.

In one embodiment, the reading module 204 is operable to read a subsequent BPU from the BPU table if the value of the traffic field of the read BPU is less than the predetermined threshold or the acceleration of the traffic of the read BPU is not equal to zero, and further operable to determine whether all BPUs in the BPU table are read, and continue to read a subsequent BPU if not all BPUs in the BPU table are read, or wait for a subsequent period if all BPUs in the BPU table are read.

Figure 2:
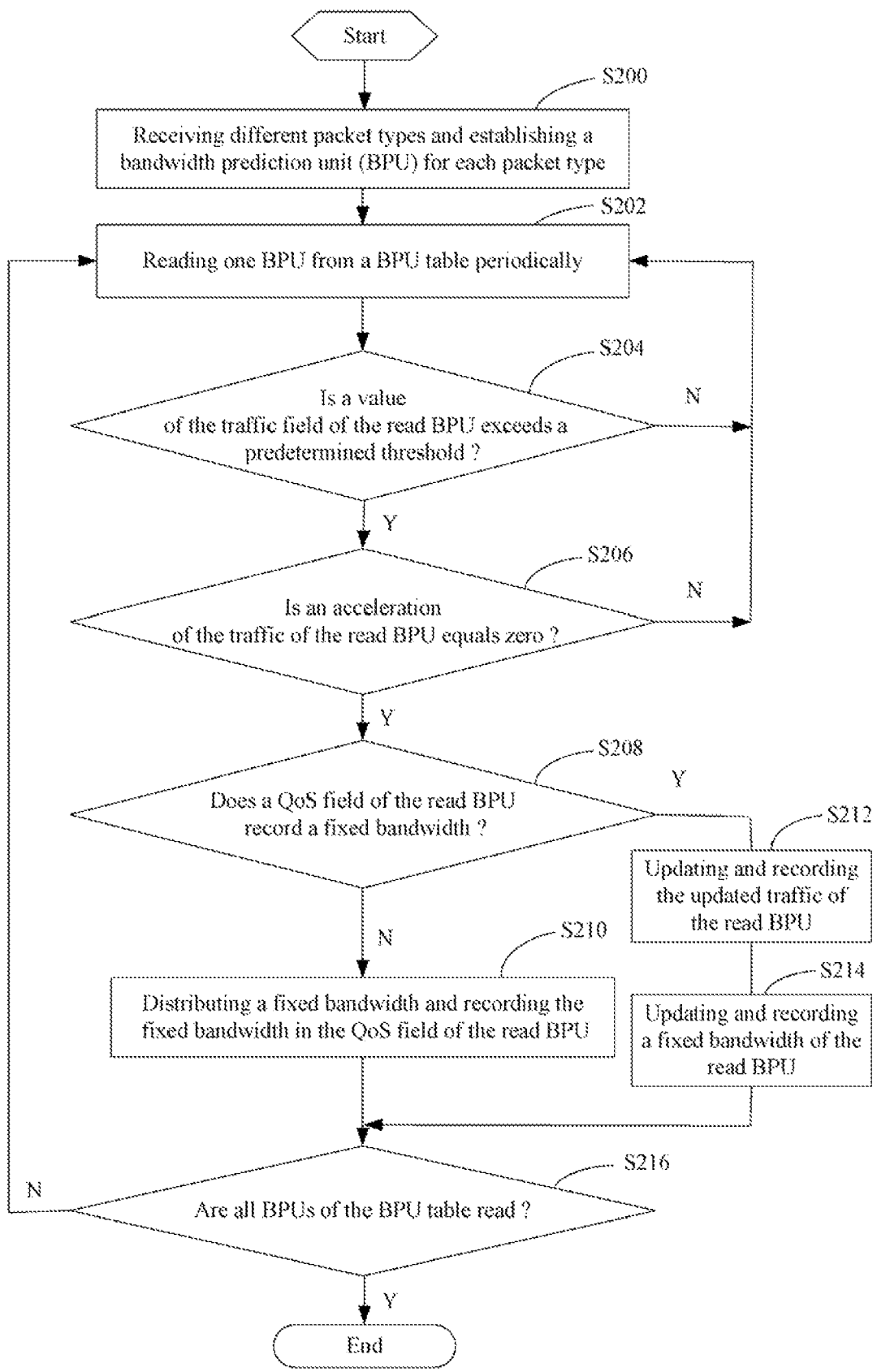
FIG. 2 is a flowchart of one embodiment of a method of establishing quality of service (QoS) of the present disclosure.

FIG. 2 is a flowchart of one embodiment of a method of establishing QoS employed in a cable modem such as, for example, that of FIG. 1, executed by the functional modules thereof. Depending on the embodiment, additional blocks may be added, others deleted, and the ordering of the blocks may be changed while remaining well within the scope of the disclosure.

In block S200, the BPU establishing module 202 receives different packet types from a communication network 30 and establishes a BPU for each packet type. Each BPU comprises a source address field, a destination address field, a packet size field, a traffic field, and a QoS field respectively operable to record a source address, a destination address, a packet size, a traffic status, and a QoS status of each packet type. A value of the traffic field changes along with the real traffic status of the corresponding packet type. In one embodiment, the BPUs of different packet types are stored in a BPU table, and a method of establishing the BPU table is described in FIG. 3.

Figure 3:
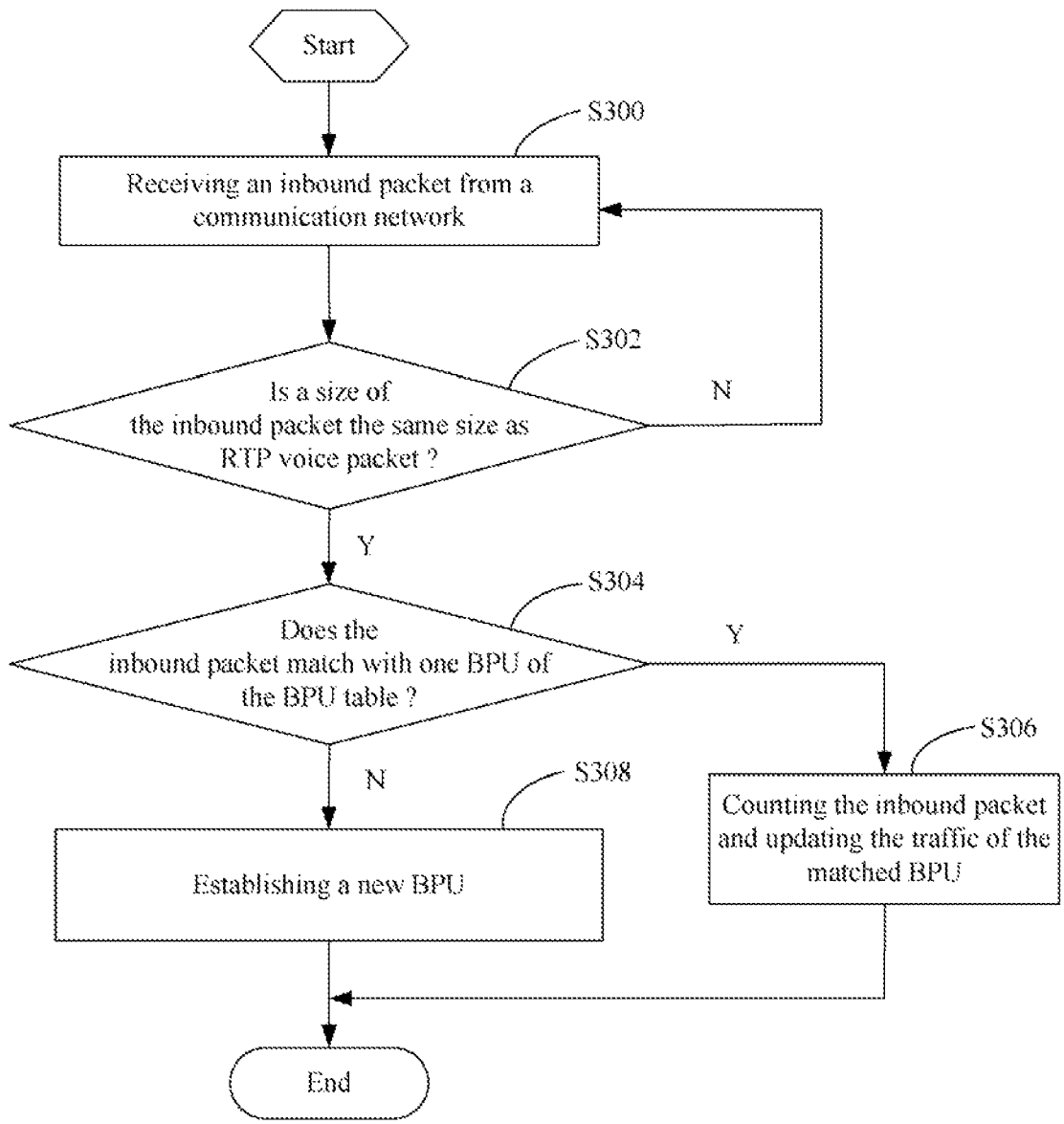
FIG. 3 is a detailed flowchart of block S200 in FIG. 2.

FIG. 3 is a flowchart of a method of establishing the BPU table in the BPU establishing module 202.

In block S300, the BPU establishing module 202 receives an inbound packet from a communication network 30, wherein the inbound packet comprises a head section and a content section. The head section comprises a source address field, a destination address field, and a packet size field respectively operable to record a source address, a destination address, and a packet size. In one embodiment, the inbound packets comprise encrypted voice packets or unencrypted voice packets, and an encrypted voice packet stream composed of a lot of encrypted voice packets. Each encrypted voice packet comprises an encrypted content section and an unencrypted head section, and the unencrypted head section also comprises a source address field, a destination address field, and a packet size field.

In block S302, the BPU establishing module 202 determines whether an inbound packet is the same size as RTP voice packet after receiving the inbound packet from the communication network 30. In one embodiment, different standards using the RTP define different voice packet sizes. For example, a standard of G.711 defines the voice packet size of 200 bytes. In one embodiment, a method of determining whether the inbound packet is the same size as the RTP voice packet is by reading the head section of the inbound packet. In one embodiment, if the inbound packet is the same size as the RTP voice packet, then the inbound packet may be a voice packet. If the inbound packet is not the same size as the RTP voice packet, then the inbound packet is not a voice packet, and the cable modem 20 sends the inbound packet directly and block S300 is repeated to receive a subsequent packet.

If the inbound packet is the same size as the RTP voice packet, then in block S304, the BPU establishing module 202 determines whether the inbound packet matches one BPU of the BPU table. In one embodiment, the cable modem 20 has recorded a plurality of BPUs in the BPU table, and a method of determining whether the inbound packet matches one BPU of the BPU table is by reading the head section of the inbound packet. In one embodiment, if a source address field, a destination address field and a packet size field of the inbound packet are the same as the corresponding field of one BPU of the BPU table, then the BPU establishing module 202 determines the inbound packet matches the BPU of the BPU table. Otherwise, the BPU establishing module 202 determines the inbound packet matches no BPU of the BPU table.

If the BPU establishing module 202 determines the inbound packet matches one BPU of the BPU table, then in block S306, the BPU establishing module 202 counts the inbound packets and updates the traffic of the matched BPU according to the inbound packet when the inbound packet matches one BPU of the BPU table. In one embodiment, if the inbound packet matches one BPU of the BPU table, then the counter 2024 updates the number of the inbound packets with the same source address, the same destination address and the same packet size to calculate the traffic of the BPU. For example, if the BPU establishing module 202 receives 10 packets with the same source address, the same destination address and the same packet size in one second, traffic is 10 packets per second. In one embodiment, by updating the number of the inbound packets with the same source address, the same destination address and the same packet size, the cable modem 20 monitors the traffic dynamically.

If the BPU establishing module 202 determines the inbound packet is not matched to a plurality of BPUs, then in block S308, the BPU establishing module 202 will establish a new BPU according to the packet source address, the packet destination address and the packet size. In one embodiment, the BPU comprises a source address field, a destination address field, a packet size field, a traffic field, and a QoS field respectively operable to record a source address, a destination address, a packet size, a traffic status, and a QoS status, and the value of the traffic field changes along with the real traffic status of the corresponding packet type. In one embodiment, a BPU which is recorded in the BPU table for the first time only comprises the source address field, the destination address field and the packet size field, and the traffic field and the QoS field will not be recorded any information until a subsequent reading cycle. Therefore, not all the fields of each BPU record information.

In one embodiment, the BPU table is established in a dynamic process. Once the cable modem 20 received an inbound packet, they will execute the flowchart in FIG. 3 and establish and record a new BPU in the BPU table when the inbound packet is in accordance with said condition above.

Return to FIG. 2. In block S202, the reading module 204 reads one BPU periodically. In one embodiment, the traffic is used to indicate the number of inbound packets with the same source address, the same destination address and the same packet size in the current status, and the value of the traffic is changed dynamically. The reading module 204 reads all BPUs from the BPU table periodically, and the time of a period is set to a proper value to make sure all BPUs in the BPU table can be read in one period.

In block S204, the determining module 206 determines whether a value of the traffic field of the read BPU exceeds a predetermined threshold. In one embodiment, the received packet stream is not in accordance with the standard of a voice packet stream using RTP if the value of the traffic field of the read BPU is less than the predetermined threshold. In practice, the value of the predetermined threshold set by the cable modem 20 is different according to the different standards. For example, the standard of G.711 defines a speed of voice packet stream is 64 kbps, and accordingly the predetermined threshold is also set to 64 kbps. Thus, when the traffic is less than 64 kbps, the determining module 206 determines the received packet stream is not a voice packet stream and reads a subsequent BPU from the BPU table.

Although the value of the traffic field of the read BPU exceeds a predetermined threshold, the determining module 206 still does not determine whether the received packet stream is a voice packet stream, then in block S206, the determining module 206 determines whether an acceleration of the traffic of the read BPU equals zero if the value of the traffic field of the read BPU exceeds the predetermined threshold. In one embodiment, the value of the traffic of the BPU table is changed dynamically. Therefore, if the cable modem 20 receives 20 packets with the same source address, the same destination address, and the same packet size in a first second, and receives 20 packets with the same source address, the same destination address, and the same packet size in a second second, then the determining module 206 determines the acceleration of the traffic of the read BPU equals zero. If the cable modem 20 receives 30 packets with the same source address, the same destination address, and the same packet size in the second second, then the determining module 206 determines the acceleration of the traffic of the read BPU is not equal to zero.

In practice, the voice packet stream transmitted in the communication network 30 has a character with the same speed. In one embodiment, an interval for determining whether the acceleration of the traffic of the read BPU equals zero is two seconds. If the number of the inbound packets with the same packet source address, the same packet destination address and the same packet size are received in the first second is the same as that in the second second, then the determining module 206 determines the acceleration of the traffic of the read BPU equals zero and indicates that the received packet stream is in accordance with the character of the same speed of the voice packet stream using RTP. If the number of the inbound packets with the same packet source address, the same packet destination address and the same packet size are received in the first second is not the same as that in the second second, then the determining module 206 will read a subsequent BPU from the BPU table. In other embodiment, the interval maybe set another time.

If the determining module 206 determines the acceleration of the traffic of the read BPU equals zero, then in block S208, the determining module 206 determines whether the QoS field of the read BPU records a fixed bandwidth. In one embodiment, it is indicate that the received packet stream is a voice packet stream when the determining module 206 determines the acceleration of the traffic of the read BPU equals zero, and the determining module 206 determines whether the QoS field of the read BPU records a fixed bandwidth. In one embodiment, if the QoS field of the read BPU records a fixed bandwidth, then the determining module 206 determines the presence of QoS in the received packet stream. If the QoS field of the read BPU records no fixed bandwidth, then the determining module 206 determines the absence of QoS in the received packet stream.

If the determining module 206 determines that the QoS field of the read BPU records no fixed bandwidth, then in block S210, the bandwidth distributing module 208 will distribute the fixed bandwidth and record the fixed bandwidth in the QoS field of the read BPU if the QoS field of the read BPU records no fixed bandwidth. For example, if the traffic of the voice packet stream is 64 kbps, then the cable modem 20 will offer 64 kbps at least to the voice packet stream to establish QoS and record 64 in the QoS field of the read BPU to indicate the presence of QoS in the received packet stream.

If the determining module 206 determines that the QoS field of the read BPU records a fixed bandwidth, then in block S212, the updating module 210 updates the traffic of the read BPU and records the updated traffic in the traffic field of the read BPU.

In block S214, the updating module 210 updates the fixed bandwidth of the read BPU according to the updated traffic and record the fixed bandwidth in the QoS field of the read BPU. In one embodiment, for example, the traffic of the voice packet stream is increased from 64 kbps to 128 kbps, which means that the voice packet stream has a request to add the fixed bandwidth and the fixed bandwidth of 64 kbps will not meet the request apparently, then the cable modem 20 will offer the fixed bandwidth of 128 kbps at least to the voice packet stream according to the updated traffic. On the other hand, if the voice packet stream is decreased from 64 kbps to 0 bit per second, the cable modem 20 will not offer the fixed bandwidth to the voice packet stream according to the updated traffic. In one embodiment, the cable modem 20 can offer the fixed bandwidth by monitoring the traffic of the voice packet stream to improve the QoS.

In block S216, the determining module 206 determines whether all BPUs in the BPU table are read, and reads a subsequent BPU from the BPU table if not. In one embodiment, the reading module 204 will return to the block S202 to read a subsequent BPU from the BPU table, on the other hand, the reading module 204 will end this reading cycle and wait for a subsequent reading cycle when all BPUs in the BPU table are read.

In one embodiment, the cable modem 20 can establish and offer the QoS by monitoring the traffic of the voice packet stream, especially, since the cable modem 20 does not need a decoder or encoder with complicated algorithm to decrypt the encrypted voice packet and determine whether to offer the QoS or not. In one embodiment, the cable modem 20 could offer the QoS to not only the encrypted voice packet stream but also the unencrypted voice packet stream according to the BPU table directly, moreover, the BPU table even could improve the utilization rate of the limited bandwidth in the cable modem 20.

While various embodiments and methods of the present disclosure have been described, it should be understood that they have been presented by example only and not by limitation. Thus the breadth and scope of the present disclosure should not be limited by the above-described embodiments, but should be defined only in accordance with the following claims and their equivalents.

What is claimed is:

1. A cable modem for establishing quality of service (QoS) for a real-time transport protocol (RTP) voice stream, the cable modem comprising:

a bandwidth prediction unit (BPU) establishing module operable to receive different packet types from a communication network, and establish a BPU for each packet type, wherein each BPU comprises a source address field, a destination address field, a packet size field, a traffic field, and a QoS field respectively operable to record a source address, a destination address, a packet size, a traffic status, and a QoS status of each packet type, wherein a value of the traffic field changes along with the real traffic status of the corresponding packet type;

a reading module operable to read one BPU periodically;

a determining module operable to determine whether the value of the traffic field of the read BPU exceeds a predetermined threshold, and determine whether an acceleration of the traffic of the read BPU equals zero if the value of the traffic field of the read BPU exceeds the predetermined threshold, and further determine whether the QoS field of the read BPU records a fixed bandwidth if the acceleration of the traffic of the read BPU equals zero;

a bandwidth distributing module operable to distribute a fixed bandwidth, and record the fixed bandwidth in the QoS field of the read BPU if the QoS field of the read BPU records no fixed bandwidth; and at least one processor operable to execute the BDU establishing module, the reading module, the determining module, and the bandwidth distributing module.

2. The cable modem as claimed in claim 1, wherein the BPU establishing module is further operable to establish a BPU table for storing BPUs of the different packet types.

3. The cable modem as claimed in claim 2, further comprising an updating module operable to update the traffic of the read BPU and record the updated traffic in the traffic field of the read BPU if the QoS field of the read BPU records a fixed bandwidth, and operable to update the fixed bandwidth of the read BPU according to the updated traffic and record the fixed bandwidth in the QoS field of the read BPU.

4. The cable modem as claimed in claim 3, wherein the reading module is further operable to read a subsequent BPU from the BPU table if the value of the traffic field of the read BPU is less than the predetermined threshold or the acceleration of the traffic of the read BPU is not equal to zero.

5. The cable modem as claimed in claim 4, wherein the reading module is further operable to determine whether all BPUs in the BPU table are read, and continue to read a subsequent BPU if not all BPUs in the BPU table are read, or wait for a subsequent period if all BPUs in the BPU table are read.

6. The cable modem as claimed in claim 2, wherein the BPU establishing module is further operable to receive an inbound packet from a communication network, and determine whether a size of the inbound packet is the same size as a RTP voice packet.

7. The cable modem as claimed in claim 6, wherein the BPU establishing module is further operable to determine whether the inbound packet matches one BPU of the BPU table if the inbound packet is the same size as the RTP voice packet, and operable to establish a new BPU if the inbound packet does not match any BPU of the BPU table.

8. The cable modem as claimed in claim 6, wherein the BPU establishing module is further operable to directly send the inbound packet and receive a subsequent inbound packet when the inbound packet is not the same size as the RTP voice packet.

9. The cable modem as claimed in claim 1, wherein the BPU establishing module comprises a counter operable to count the inbound packet, and update the traffic of the matched BPU according to the inbound packet when the inbound packet matches one BPU of the BPU table.

10. The cable modem as claimed in claim 1, wherein the RTP voice stream comprises a plurality of encrypted RTP voice packets including an unencrypted header and an encrypted body, wherein the unencrypted header comprises a source address field, a destination address field, and a packet size field.

11. A method of establishing quality of service (QoS) for a real-time transport protocol (RTP) voice stream, the method comprising:
receiving different packet types from a communication network and establishing a bandwidth prediction unit (BPU) for each packet type, wherein each BPU comprises a source address field, a destination address field, a packet size field, a traffic field, and a QoS field respectively operable to record a source address, a destination address, a packet size, a traffic status, and a QoS status of each packet type, wherein a value of the traffic field changes along with the real traffic status of the corresponding packet type;
reading one BPU periodically;
determining whether the value of the traffic field of the read BPU exceeds a predetermined threshold;
determining whether an acceleration of the traffic of the read BPU equals zero if the value of the traffic field of the read BPU exceeds the predetermined threshold;
determining whether the QoS field of the read BPU records a fixed bandwidth if the acceleration of the traffic of the read BPU equals zero; and
distributing a fixed bandwidth and recording the fixed bandwidth in the QoS field of the read BPU if the QoS field of the read BPU records no fixed bandwidth.

12. The method as claimed in claim 11, further comprising: establishing a BPU table for storing BPUs of the different packet types.

13. The method as claimed in claim 12, further comprising: updating the traffic of the read BPU and recording the updated traffic in the traffic field of the read BPU if the QoS field of the read BPU records a fixed bandwidth.

14. The method as claimed in claim 13, further comprising: updating a fixed bandwidth of the read BPU according to the updated traffic and recording the fixed bandwidth in the QoS field of the read BPU.

15. The method as claimed in claim 14, further comprising: reading a subsequent BPU from the BPU table if the value of the traffic field of the read BPU is less than the predetermined threshold or the acceleration of the traffic of the read BPU is not equal to zero.

16. The method as claimed in claim 12, further comprising:
determining whether all BPUs in the BPU table are read;
continuing to read a subsequent BPU if not all BPUs in the BPU table are read; and
waiting for a subsequent period if all BPUs in the BPU table are read.

17. The method as claimed in claim 12, wherein the establishing step comprising:
receiving an inbound packet from a communication network;
determining whether a size of the inbound packet is the same size as a RTP voice packet;
determining whether the inbound packet matches one BPU of the BPU table if the inbound packet is the same size as the RTP voice packet; and
establishing a new BPU if the inbound packet does not match any BPU of the BPU table.

18. The method as claimed in claim 17, wherein the establishing step further comprising: sending the inbound packet and receiving a subsequent packet when the inbound packet is not the same size as the RTP voice packet.

19. The method as claimed in claim 17, wherein the establishing step further comprising: counting the inbound packet, and updating the traffic of the matched BPU according to the inbound packet when the inbound packet matches one BPU of the BPU table.

20. The method as claimed in claim 11, wherein the RTP voice stream comprises a plurality of encrypted RTP voice packets including an unencrypted header and an encrypted body, wherein the unencrypted header comprises a source address field, a destination address field, and a packet size field.

* * * * *